F. W. PARSONS.
FLUID ACTUATED CLUTCH PULLEY.
APPLICATION FILED NOV. 9, 1920.
1,401,551.
Patented Dec. 27, 1921.
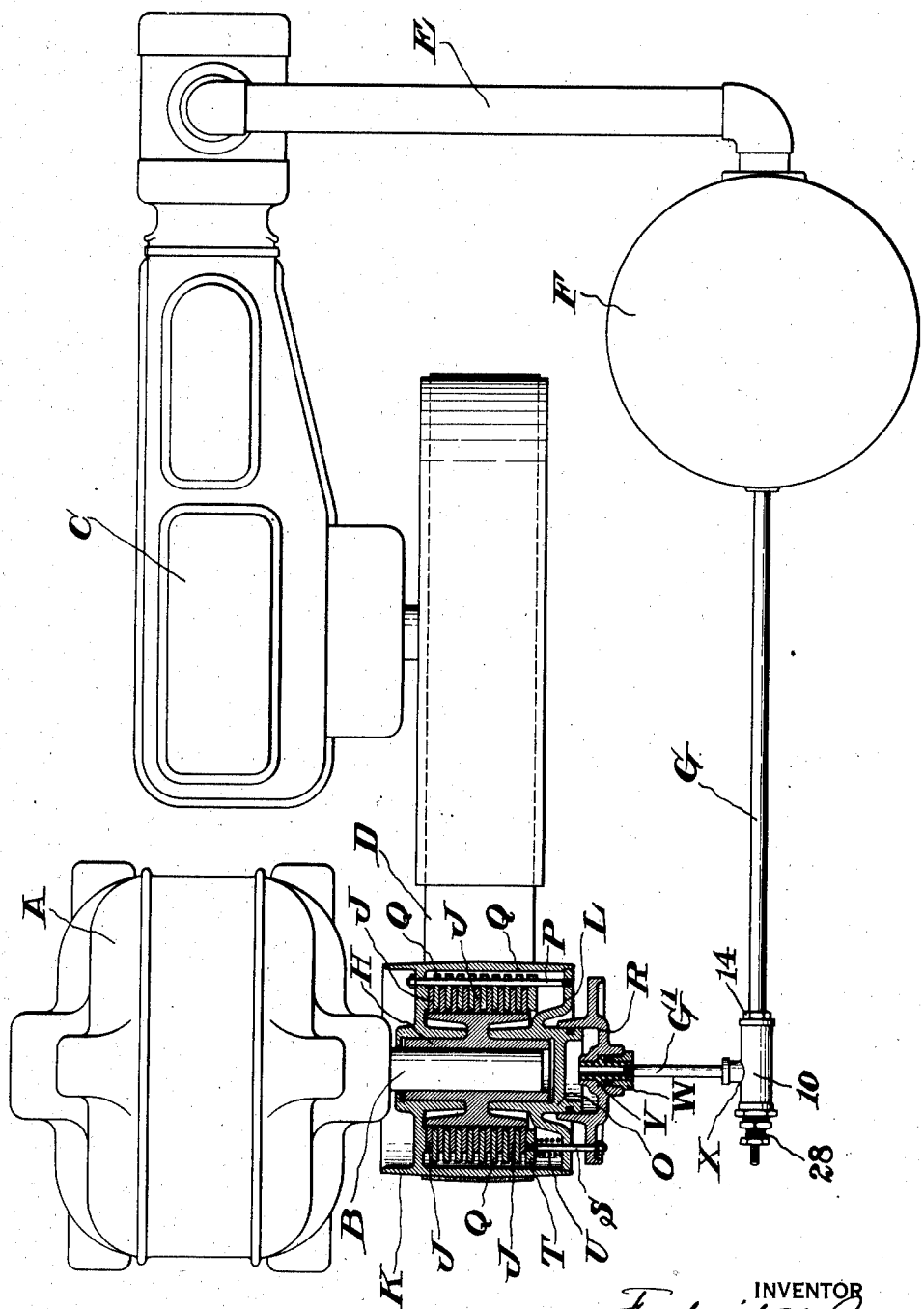

UNITED STATES PATENT OFFICE.

FREDERICK W. PARSONS, OF ELMIRA, NEW YORK, ASSIGNOR TO INGERSOLL-RAND COMPANY, OF JERSEY CITY, NEW JERSEY, A CORPORATION OF NEW JERSEY.

FLUID-ACTUATED CLUTCH-PULLEY.

1,401,551.           Specification of Letters Patent.     Patented Dec. 27, 1921.

Application filed November 9, 1920. Serial No. 422,976.

*To all whom it may concern:*

Be it known that I, FREDERICK W. PARSONS, a citizen of the United States, a resident of Elmira, county of Chemung, State of New York, have invented certain new and useful Improvements in Fluid-Actuated Clutch-Pulleys, of which the following is a specification.

This invention relates to clutch pulleys but more particularly to a fluid actuated clutch pulley and the primary object of the invention is to secure a pulley of that class in which the clutch members may be engaged and disengaged quickly and smoothly by suitable automatic means. I prefer a pulley construction of the friction clutch type having series of alternately arranged inner and outer disks preferably running in oil and normally held in frictional engagement by spring pressure for instance, which pressure is relieved by fluid under pressure, thus relieving the frictional engagement between the disks, and disconnecting the pulley casing or wheel from the driver or driving member. Such a pulley may be used with any apparatus to which it is found applicable, as for instance on the shaft of an electric motor for driving a compressor, with a properly regulated connection from the air receiver to the pulley so that the friction members are automatically disengaged when the receiver pressure reaches a predetermined amount, but the motor continues to run, without driving the compressor. This obviates the necessity of starting and stopping the motor.

Further objects of the invention will hereinafter appear and the invention is illustrated in one of its preferred forms in the accompanying drawing, which is a diagrammatic plan view of apparatus embodying the invention with the clutch shown in horizontal section.

Referring to the drawing, the invention is illustrated in connection with a motor driven compressor in which apparatus the motor A is provided with the clutch pulley on the shaft B and drives the compressor C through the belt connection D. The compressor is connected by the pipe E to the usual receiver F and a pipe connection G leads back to the clutch pulley for the purpose hereinafter to be explained.

In accordance with my invention, the pulley is constructed with an inner disk driver H adapted to be connected to the shaft B, and on this driver a series of inner disks J are slidably arranged side by side but rotatable therewith by means of a key or other suitable device. A pulley casing K loose on the driver H is arranged outside of the inner disks J and an end plate L is provided for the casing having a bearing on the driver H and provided with a head O at the outer end of the pulley. The chamber formed inside the pulley casing is preferably filled with oil. Longitudinal clutch tie rods P connect the casing K and the end plate together, and a series of outer disks Q are loosely held by said tie rods, the outer disks being arranged alternately with the inner disks as shown.

A piston R is slidably mounted for longitudinal movement on the head O of the end plate L and this piston rotates with the end plate L as by means of the bolts S passing through the end plate and connecting the piston with the end disk T of the outer series. There may be as many clutch tie rods P and clutch bolts S as desired, only one of each being illustrated in the drawing because the clutch is shown in sectional view. Springs U surround the clutch bolts S inside the casing and normally tend to press the disks together.

Suitable means are provided for admitting fluid pressure behind the piston R and between the piston and the head O of the end plate L and in this instance the air pipe G' is threaded to the hollow air connector sleeve V on which the piston rotates. A suitable air connection gland W forms an air tight joint at this point.

In the operation of the device, the springs U normally maintain the inner and outer series of disks in frictional engagement so that the motor drives the outer pulley casing K from the inner disk driver H but if fluid under sufficient pressure is admitted behind the piston R the piston will be moved outwardly and thus compress the springs U and relieve the frictional engagement between the disks thus disconnecting the pulley members. In the drawing it is to be understood that there is sufficient flexibility in the small pipe connection G' to permit a slight relative movement between the end plate L of the pulley and the piston R.

In the drawing, I have shown for illustrative purposes, a pressure controlled pilot valve X in the pipe G leading from the receiver F. It is to be understood that a valve of the type shown in U. S. Patent No. 1,138,278 granted May 4, 1915, to J. H. Castle and W. G. Rogers may be used, which is so constructed that the valve operates to admit a certain predetermined receiver pressure to a regulating mechanism such as the clutch pulley shown, until the receiver pressure again falls a certain amount below that required to operate the valve, in which case the valve returns to its original position, allowing the regulating mechanism to exhaust to atmospheric pressure. I have merely indicated the valve chest 10, the adjustable valve plug 14, and the spring cup 28, corresponding to similar parts similarly numbered in the said patent, it being understood that any other suitable pilot valve may be used in the location indicated by the valve X and this valve forms no part of my invention.

I claim:

1. A fluid actuated clutch pulley, comprising an inner disk driver adapted to be connected to a shaft, a series of inner disks slidable upon but rotatable with the said driver, a pulley casing having an end plate, clutch tie rods connecting said casing and end plate, a series of outer disks loosely carried by said tie rods and arranged alternately with the inner disks, a piston rotatable with the casing, the said piston and end plate having relative longitudinal movement, springs inside the casing for normally pressing the disks together, and means for relieving the spring pressure on the disks when fluid pressure is supplied to the piston.

2. A fluid actuated clutch pulley, comprising an inner disk driver adapted to be connected to a shaft, a series of inner disks slidable upon but rotatable with the said driver, a pulley casing having an end plate, clutch tie rods connecting said casing and end plate, a series of outer disks loosely carried by said tie rods and arranged alternately with the inner disks, a piston rotatable with the casing, the said piston and end plate having relative longitudinal movement, springs inside the casing for normally pressing the disks together, bolts connecting the end disk of the outer series with the piston, and means for admitting fluid pressure behind the piston and thereby relieving the said spring pressure.

3. A fluid actuated clutch pulley, comprising an inner disk driver adapted to be connected to a shaft, a series of inner disks slidably arranged side by side on the periphery of said driver and rotatable therewith, a pulley casing outside of said disks, an end plate for said casing, longitudinal clutch tie rods connecting said casing and end plate, a series of outer disks loosely held by said tie rods, the outer disks being arranged alternately with the inner disks, a piston slidable longitudinally on the said end plate, springs between the end plate and the end disk of the outer series, bolts passing through the end plate and connecting the said end disk of the outer series to the piston, and means for supplying fluid pressure between the end plate and piston to relieve the spring pressure on the disks and disconnect the clutch.

In testimony whereof I have signed this specification.

FREDERICK W. PARSONS.